United States Patent
Yorinaga et al.

(10) Patent No.: US 7,729,251 B2
(45) Date of Patent: *Jun. 1, 2010

(54) ASYNCHRONOUS TRANSFER MODE SWITCH

(75) Inventors: Tomoyuki Yorinaga, Tokyo (JP); Shigeo Takahashi, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 485 days.

This patent is subject to a terminal disclaimer.

(21) Appl. No.: 11/686,122

(22) Filed: Mar. 14, 2007

(65) Prior Publication Data

US 2007/0206499 A1     Sep. 6, 2007

Related U.S. Application Data

(63) Continuation of application No. 09/929,367, filed on Aug. 15, 2001, now Pat. No. 7,209,441.

(30) Foreign Application Priority Data

Aug. 15, 2000 (JP) ............................. 2000-246373

(51) Int. Cl.
    *H04L 12/56*     (2006.01)
(52) U.S. Cl. ..................... 370/233; 370/235; 370/395.2
(58) Field of Classification Search ......... 370/412–418, 370/395.51, 395.52, 395.6, 395.61, 395.64, 370/229–236, 396–399, 395.2; 709/232–235, 709/225–229

See application file for complete search history.

(56) References Cited

U.S. PATENT DOCUMENTS 5,457,687 A * 10/1995 Newman ..................... 370/232

5,528,591 A * 6/1996 Lauer .......................... 370/231

(Continued)

FOREIGN PATENT DOCUMENTS

JP      8-125668      5/1996

(Continued)

OTHER PUBLICATIONS

Zhang et al., Integrated Rate and Credit Feedback Control for ABR Service in ATM Networks, IEEE, 1997, pp. 1295-1303.

(Continued)

*Primary Examiner*—Aung S Moe
*Assistant Examiner*—Habte Mered
(74) *Attorney, Agent, or Firm*—Harrity & Harrity, LLP

(57) ABSTRACT

The invention provides an ATM switch which realizes hierarchical shaping for each virtual channel and each virtual path with a simple configuration. Cells are sent from cell buffers of an ATM core switch by FIFO operation to output side connection information application sections of output side circuit interfaces. In each of the output side circuit interfaces, the output side connection information application section acquires connection information such as a service class based on an intra-switch connection identification number applied to each cell and applies the connection information to the cell. An output cell buffer queues cells for each virtual channel. A VC cell rate control section reads out cells from the output cell buffer in accordance with the connection information and performs traffic priority control and rate control of the cells to be outputted. Cells of each virtual channel are outputted at a rate equal to or higher than a minimum cell rate but equal to or lower than a peak cell rate in accordance with a VP cell rate control signal representative of the cell storage amount in a VP cell rate control section in the following stage. The VP cell rate control section queues cells into a buffer for each virtual path and performs traffic priority control and rate control of the cells.

20 Claims, 6 Drawing Sheets

U.S. PATENT DOCUMENTS

| | | | |
|---|---|---|---|
| 5,694,554 | A | 12/1997 | Kawabata et al. |
| 5,771,231 | A | 6/1998 | Watanabe |
| 5,790,770 | A | 8/1998 | McClure et al. |
| 6,275,494 | B1 | 8/2001 | Endo et al. |
| 6,324,165 | B1 | 11/2001 | Fan et al. |
| 6,389,026 | B1 | 5/2002 | Kozaki et al. |
| 6,512,741 | B1 | 1/2003 | Kohzuki et al. |
| 6,526,024 | B1 | 2/2003 | Spagnolo et al. |
| 6,643,293 | B1 | 11/2003 | Carr et al. |
| 6,690,678 | B1 | 2/2004 | Basso et al. |
| 6,775,287 | B1 | 8/2004 | Fukano et al. |
| 6,775,293 | B1 | 8/2004 | Robotham et al. |
| 6,934,253 | B2 * | 8/2005 | Hoogenboom et al. ...... 370/232 |
| 7,209,441 | B2 * | 4/2007 | Yorinaga et al. ............ 370/233 |
| 2002/0054568 | A1 | 5/2002 | Hoogenboom et al. |

FOREIGN PATENT DOCUMENTS

| | | |
|---|---|---|
| JP | 8-242233 | 9/1996 |
| JP | 9-247166 | 9/1997 |
| JP | 10-294741 | 11/1998 |
| JP | 11-88374 | 3/1999 |
| JP | 11-136252 | 5/1999 |
| JP | 2000-31974 | 1/2000 |
| WO | WO 97/04543 | 2/1997 |

OTHER PUBLICATIONS

Lihong et al., Rate-based Traffic Control Technique in Credit Style for ABR Service in ATM Networks, IEEE, 1998, pp. 1-5.

Yorinaga et al., co-pending U.S. Appl. No. 09/929,367, filed Aug. 15, 2001, Asynchronous Transfer Mode Switch.

* cited by examiner

FIG. 3

INPUT SIDE CONNECTION INFORMATION TABLE

| INPUT CIRCUIT NUMBER/VPI/VCI | SERVICE CLASS | MINIMUM CELL RATE | OUTPUT SWITCH PORT NUMBER | INTRA-SWITCH CONNECTION IDENTIFICATION NUMBER |
|---|---|---|---|---|
| 0/0/32 | 0 | 1200 | 0 | 1000 |
| 0/0/33 | 1 | 100 | 4 | 2000 |
| ⋮ | ⋮ | ⋮ | ⋮ | ⋮ |
| — — — | — | — | — | — |

FIG. 6

OUTPUT SIDE CONNECTION INFORMATION TABLE

| INTRA-SWITCH CONNECTION IDENTIFICATION NUMBER | SERVICE CLASS | VC MINIMUM CELL RATE | VC PEAK CELL RATE | VP PEAK CELL RATE | OUTPUT CIRCUIT NUMBER | OUTPUT VPI/VCI |
|---|---|---|---|---|---|---|
| 1000 | 0 | 1200 | 2000 | 6000 | 0 | 0/32 |
| 2000 | 1 | 100 | 200 | 600 | 2 | 0/33 |
| ... | ... | ... | ... | ... | ... | ... |
| — | — | — | — | — | — | — |

ASYNCHRONOUS TRANSFER MODE SWITCH

RELATED APPLICATIONS

This application is a continuation of U.S. patent application Ser. No. 09/929,367 filed Aug. 15, 2001, now U.S. Pat. No. 7,209,441 which is incorporated by reference herein.

BACKGROUND OF THE INVENTION

1. Field of the Invention

The present invention relates to an ATM (Asynchronous Transfer Mode) switch, and more particularly to an ATM switch which performs cell rate shaping of changing the output rate dynamically for each virtual channel (VC) and for each virtual path (VP) in response to a stored amounts of cells.

2. Description of the Related Art

Conventionally, an ATM switch has a cell rate shaping function on the output cell buffer side and output cells with the peak cell rate controlled for each virtual channel or virtual path.

It is sometimes desired to achieve minimum cell rate assurance of each virtual channel (VC) of a virtual path (VP) and peak cell rate shaping of the virtual path and each virtual channel of the virtual path on condition of $\Sigma(VCMCR) \leq VPPCR \leq \Sigma(VCPCR)$ where $\Sigma(VCPCR)$ is the peak cell rate total value 20 of the virtual channels in the virtual path, $\Sigma(VCMCR)$ is the minimum cell rate total value of the virtual channels in the virtual path, and VPPCR is the peak cell rate of the virtual path. However, with a conventional shaper, if cell rate shaping is performed for each virtual path, then it is impossible to realize minimum cell rate assurance and peak cell rate shaping of each virtual channel in a virtual path.

Also it seems a possible method to use two conventional shapers connected in two stages such that the peak cell rate is controlled for each virtual channel in the preceding stage whereas the peak cell rate is controlled for each virtual path in the succeeding stage. However, in order to realize the minimum cell rate assurance for each virtual channel in both of the two stages, complicated feedback control to the input cell buffer side is required, and even if the minimum cell rate assurance is realized, a high cost is required disadvantageously.

SUMMARY OF THE INVENTION

An aspect of the present invention provides an ATM switch which realizes hierarchical shaping for each virtual channel and each virtual path with a simple configuration.

In one aspect of the present invention, the output rate for each virtual channel is changed dynamically within a range from a minimum cell rate to a peak cell rate in accordance with a stored amount of cells by rate shaping for each virtual path.

More particularly, according to the present invention, there is provided an ATM switch, comprising one or more input side circuit interfaces, one or more output side circuit interfaces, and an ATM core switch for outputting cells inputted thereto from the input side circuit interface or interfaces to the output side circuit interface or interfaces, each of the output side circuit interfaces feeding back a cell number accumulated for each virtual channel to a corresponding one of the input side circuit interfaces, each of the input side circuit interfaces shaping the rate of cells based on the feedback from a corresponding one of the output side circuit interfaces so that a peak cell rate total value of virtual channels which belong to a virtual path may not exceed a peak cell rate of the virtual path, each of the output side circuit interfaces controlling, based on the cell number accumulated for each virtual channel, so that the peak cell rate of the virtual path to which the virtual channels belong may not exceed the peak cell rate total value of the virtual channels which belong to the virtual path.

Each of the input side circuit interfaces may include 15 a physical layer processing section which terminates a cell, and an input virtual channel cell rate control section for receiving the cell terminated by the physical layer processing section and controlling the rate of cell for each virtual channel based on the feedback.

Each of the output side circuit interfaces may include an output virtual channel cell rate control section for storing a cell number accumulated for each virtual channel, an output virtual path cell rate control section for controlling the cell rate for each virtual channel based on the cell number accumulated in the output virtual channel cell rate control section, and a physical layer section for outputting a cell from the output virtual channel cell rate control section to a circuit, the output virtual channel cell rate control section feeding back the cell number to the input virtual channel cell rate control section.

The ATM core switch may include multiplexing means for multiplexing cells from all of the output side circuit interface sections, filter means for comparing output port identification numbers applied to the cells with output port numbers of the filter means themselves and passing therethrough only those cells which exhibit coincidence in the comparison, and a cell buffer of the first-in first-out type provided for each output port for temporarily storing those cells which have passed through the corresponding filter means, converting the rate of the cells and outputting the resulting cells to a corresponding one of the output side circuit interfaces.

Preferably, the input cell rate control section stores an input circuit number, a service class, a minimum cell rate, an output switch port number and an intra-switch connection identification number of contents of a contract concluded in advance in a corresponding relationship to a virtual path identifier/virtual channel identifier of an input cell.

Preferably, the output virtual channel cell rate control section stores a service class, a virtual channel minimum cell rate, a virtual channel peak cell rate, a virtual path peak cell rate, an output circuit number and an output virtual path identifier/virtual channel identifier of contents of a contract concluded in advance in a corresponding relationship to an intra-switch connection identification number of each cell.

With the ATM switch, hierarchical shaping for each virtual channel and for each virtual path can be achieved with a simple configuration and control.

The above features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 3 is a diagrammatic view illustrating an input side connection information table illustrated in FIG. 2;

FIG. 6 is a diagrammatic view illustrating an output side connection information table illustrated in FIG. 5.

DESCRIPTION OF THE PREFERRED EMBODIMENTS

Figure 1:
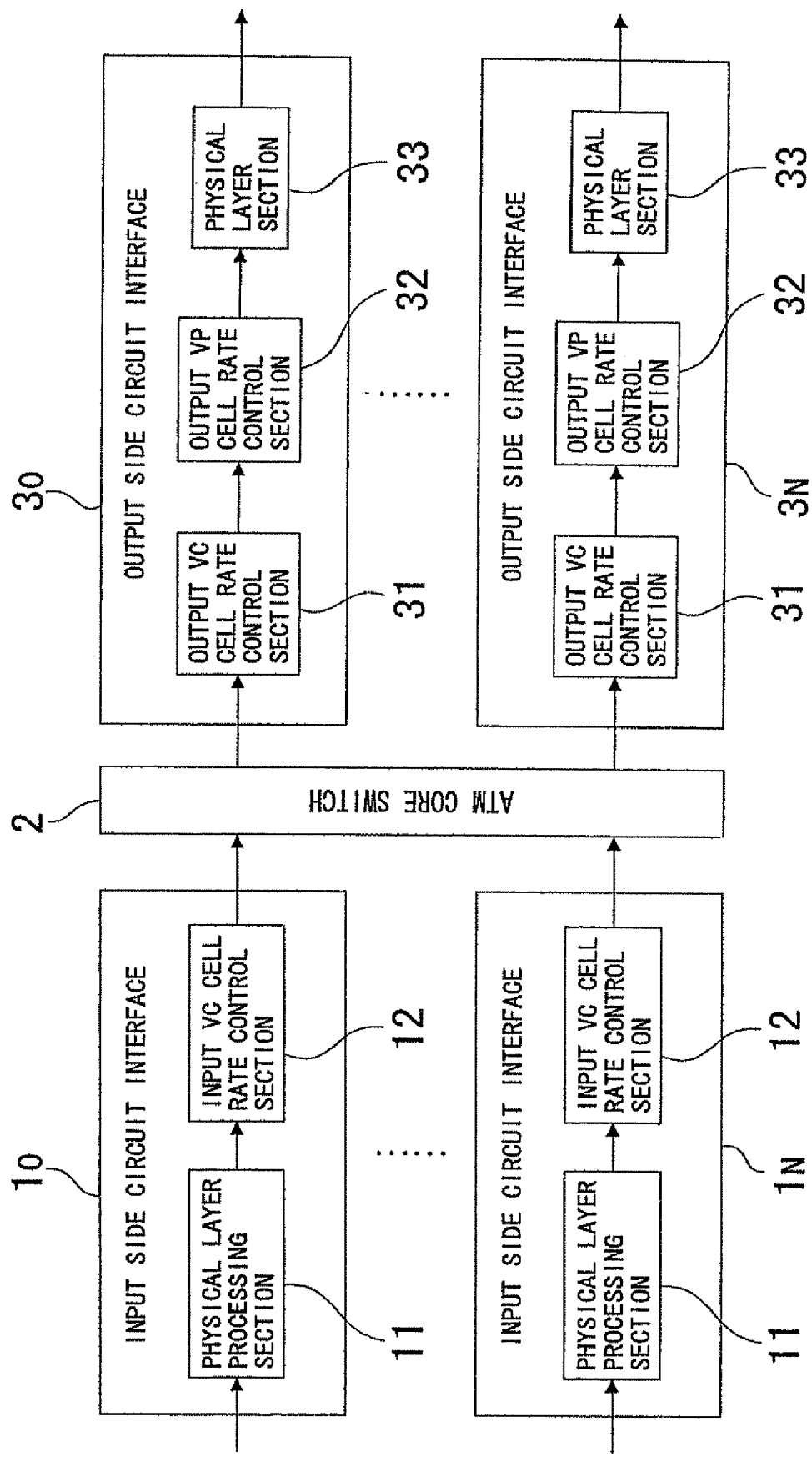
FIG. 1 is a block diagram of an ATM switch to which the present invention is applied.

Referring first to FIG. 1, there is shown an ATM switch to which the present invention is applied. The ATM switch shown includes a plurality of input side circuit interfaces $1_0$ to $1_N$, an ATM core switch 2, and a plurality of output side circuit interfaces $3_0$ to $3_N$.

Each of the input side circuit interfaces $1_0$ to $1_N$ includes a physical layer processing section 11 and an input VC cell rate control section 12. The physical layer processing section 11 terminates cells and sends the cells to the input VC cell rate control section 12. The input VC cell rate control section 12 controls the rate of cells for each virtual channel based on feedback.

Each of the output side circuit interfaces $3_0$ to $3_N$ includes 15 an output VC cell rate control section 31 for storing a number of cells stored for each virtual channel, an output VP cell rate control section 32 for controlling the cell rate for each virtual path based on the number of cells stored in the output VC cell rate control section 31, and a physical layer section 33 for outputting cells from the output VP cell rate control section 32 to a circuit. The output VC cell rate control section 31 feeds back a cell number to the input VC cell rate control section 12.

Figure 2:
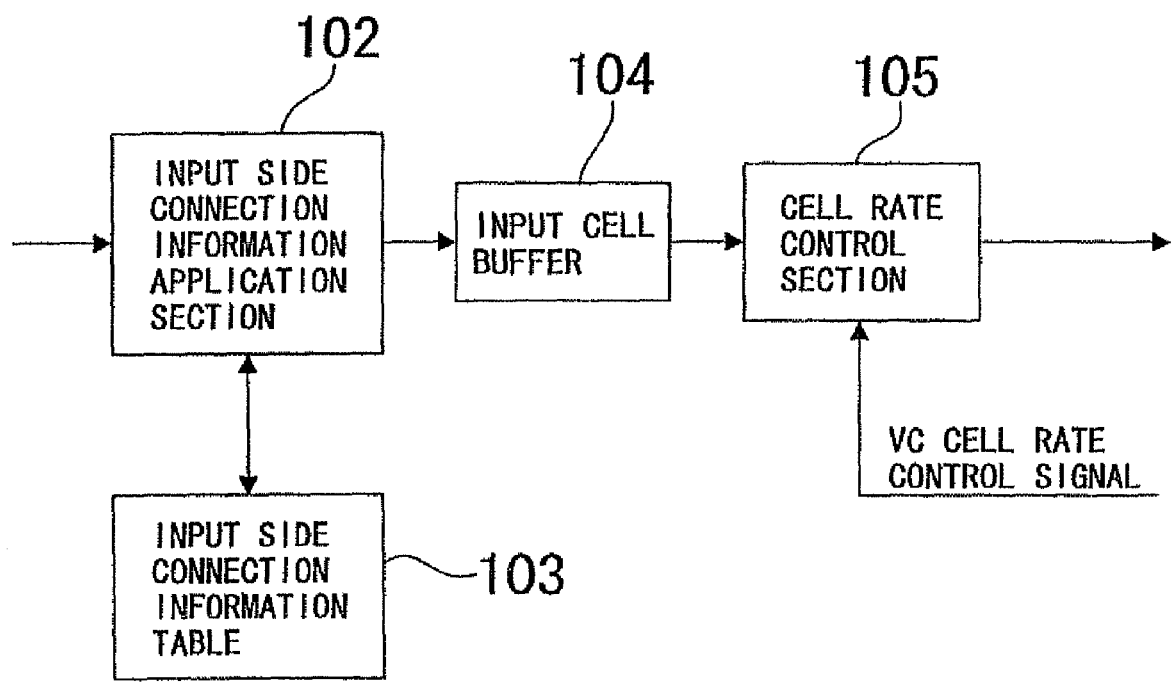
FIG. 2 is a block diagram of a VC cell rate control section of an input side circuit interface shown in FIG. 1.

FIG. 2 shows a configuration of the input VC cell rate control section 12 of the input side circuit interfaces $1_0$ to $1_N$. Referring to FIG. 2, the input VC cell rate control section 12 includes an input side connection information application section 102, an input side connection information table 103, an input cell buffer 104 and a cell rate control section 105.

The input side connection information application section 102 acquires, based on an input circuit number and the VPI (Virtual Path Identifier)/VCI (Virtual Channel Identifier) of the header of a cell, connection information such as a service class, a minimum cell rate, an output switch port number and an intra-switch connection identification number of the cell from the input side connection information table 103.

The input cell buffer 104 queues cells for each virtual channel.

The cell rate control section 105 performs traffic priority control and rate control of cells of reading out cells from the input cell buffer 104 in accordance with connection information applied to the cells and outputting the cells to the ATM core switch 2.

Cells of each virtual channel are outputted at a rate equal to or higher than the minimum cell rate in accordance with a VC cell rate control signal representative of the cell storage amount in each of the output side circuit interfaces $3_0$ to $3_N$.

FIG. 3 illustrates an example of the input side connection information table 103. The input side connection information table 103 illustrated has stored in advance therein an input circuit number, a service class, a minimum cell rate, an output switch port number and an intra-switch connection identification number of contents of a contract concluded in advance.

Figure 4:
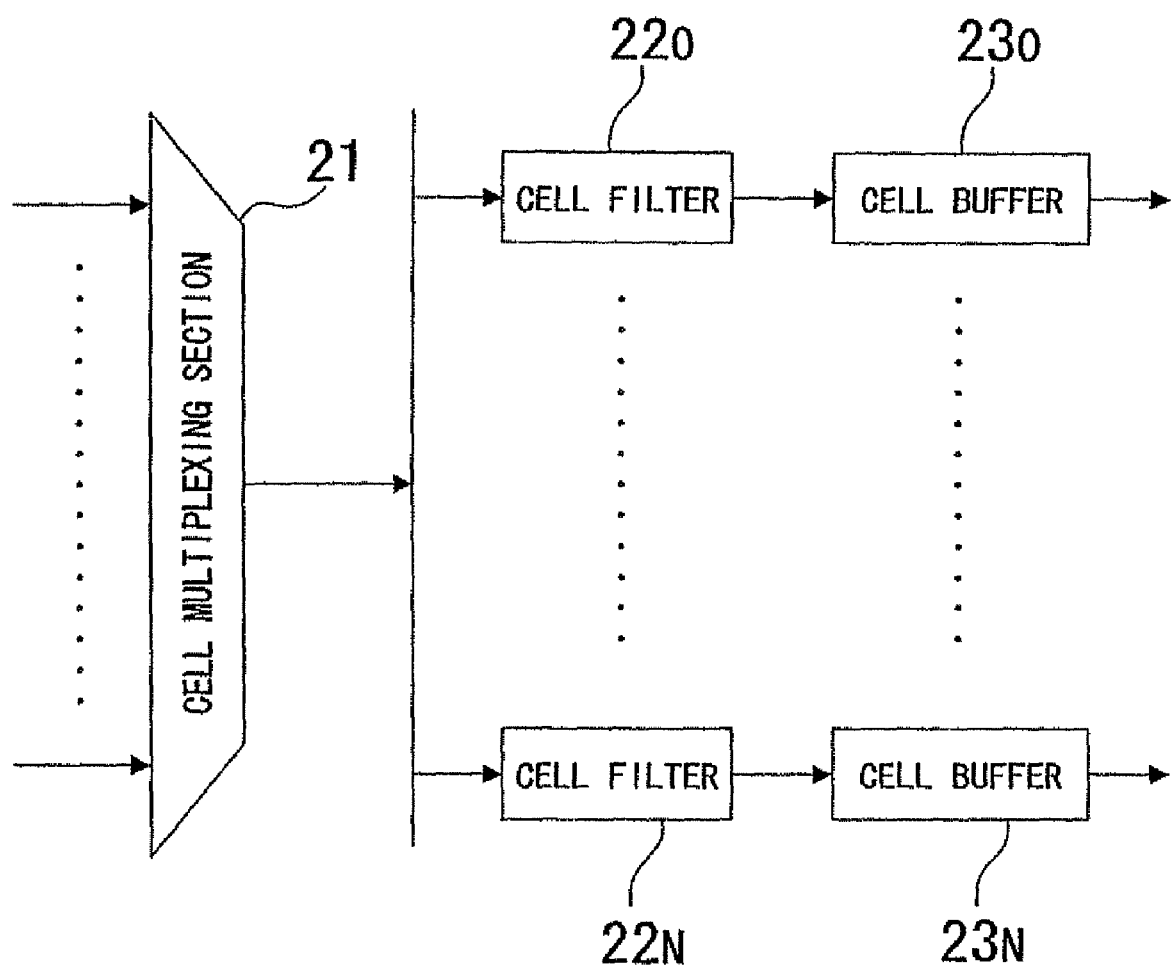
FIG. 4 is a block diagram of an ATM core switch shown 20 in FIG. 1.

FIG. 4 shows a configuration of the ATM core switch 2. 5 Referring to FIG. 4, the ATM core switch 2 shown includes a cell multiplexing section 21, a plurality of cell filters $22_0$ to $22_N$, and a plurality of cell buffers $23_0$ to $23_N$ connected to the output sides of the cell filters $22_0$ to $22_N$, respectively.

The cell multiplexing section 21 multiplexes all cells 10 from all of the input side circuit interfaces $1_0$ to $1_N$ and outputs the multiplexed cells to a high speed bus. The cell filters $22_0$ to $22_N$ compare output port identification numbers applied to cells with output port numbers of the cell filters themselves and pass therethrough only those cells which indicate coincidence in the comparison. The cell buffers $23_0$ to $23_N$ temporarily store those cells, which have passed through the corresponding cell filters $22_0$ to $22_N$, for the individual output ports, convert the rates of the cells and output the cells to the output side circuit interfaces $3_0$ to $3_N$ through FIFO operation, respectively.

Figure 5:
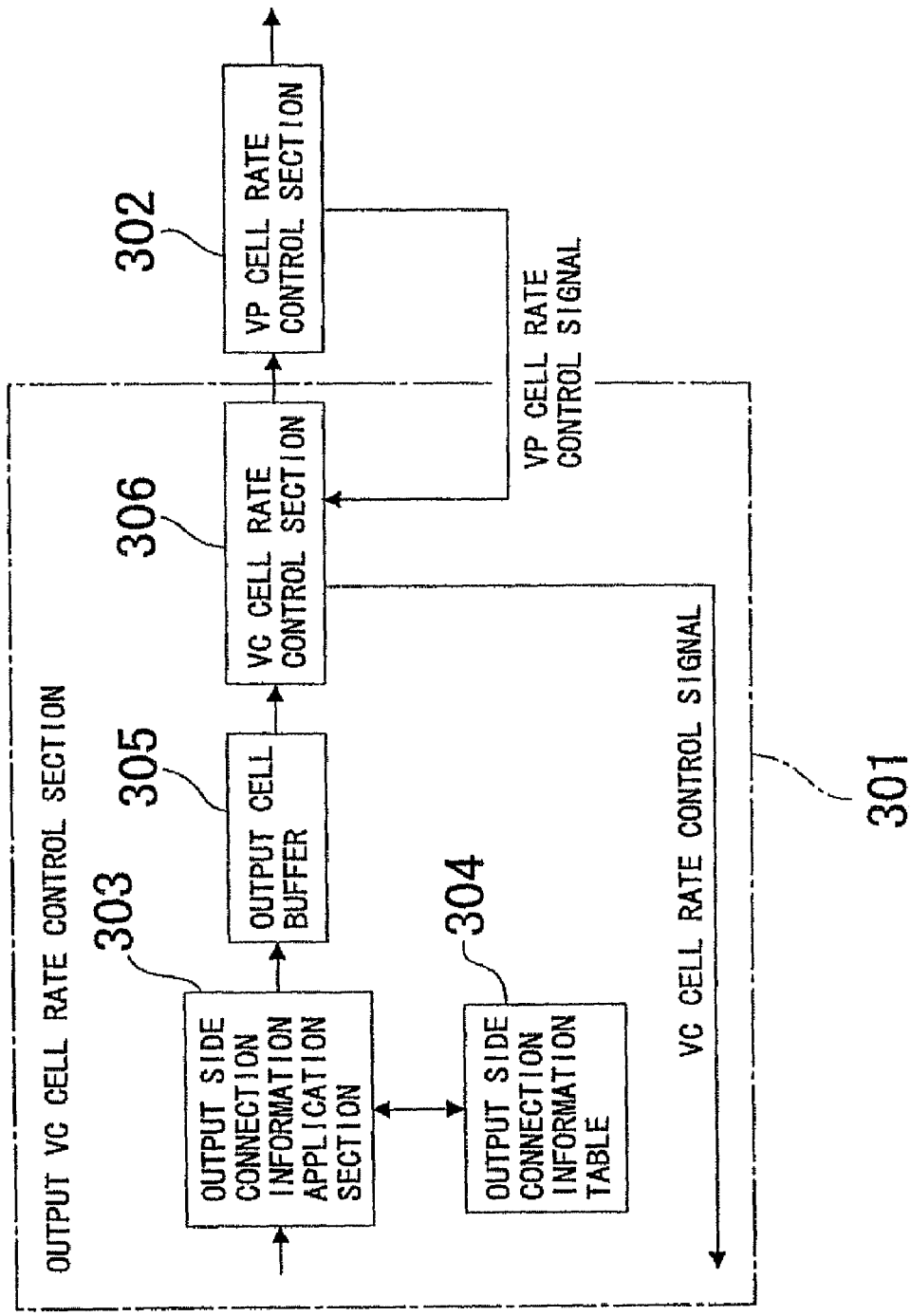
FIG. 5 is a block diagram of a VC cell rate control section and a VP cell rate control section of an output side circuit interface shown in FIG. 1.

FIG. 5 shows a detailed configuration of the output VC cell rate control section 31 together with the output VP cell rate control section 32 of the output side circuit interfaces $3_0$ to $3_N$ described hereinabove with reference to FIG. 1. It is to be noted that, in FIG. 5, the output VC cell rate control section 31 and the output VP cell rate control section 32 are represented as output VC cell rate control section 301 and VP cell rate control section 302, respectively. Referring to FIG. 5, the output VC cell rate control section 301 includes an output side connection information application section 303, an output side connection information table 304, an output cell buffer 305, and a VC cell rate control section 306.

The output side connection information application section 303 acquires connection information of a cell such as a service class, a VC minimum cell rate, a VC peak cell rate, a VP peak cell rate, an output circuit number and an output VPI/VCI based on an intra-switch connection identification number applied to the cell from the output side connection information table 304, and applies the acquired connection information to the cell.

The output cell buffer 305 queues cells for each virtual channel.

The VC cell rate control section 306 reads out cells from the output cell buffer 305 in accordance with connection information applied to the cells and performs traffic priority control and rate control of the cells to be outputted. Cells of each virtual channel are outputted at a rate equal to or higher than the minimum cell rate but equal to or lower than the peak cell rate in accordance with a VP cell rate control signal representative of the cell storage amount in the VP cell rate control section 302 in the next stage.

The VP cell rate control section 302 queues cells into a buffer for each virtual path, reads out the cells from the buffer in accordance with connection information applied to the cells, and performs traffic priority control and rate control of the cells to be outputted to a circuit. Cells of each virtual path are outputted at a rate equal to or lower than the peak cell rate.

FIG. 6 illustrates an example of the output side connection information table 304. The output side connection information table 304 illustrated has stored therein, in a corresponding relationship to an intra-switch connection identification number of an input cell inputted from the ATM core switch 2, a service class, a VC minimum cell rate, a VC peak cell rate (VCPCR), a VP peak cell rate (VPPCRVCP), an output circuit number and an output VPI/VCI of contents of a contract concluded in advance.

Now, cell rate shaping operation of the ATM switch of the present embodiment is described.

In each of the input side circuit interfaces $1_0$ to $1_N$, a cell from a circuit is terminated by the physical layer processing section 11 and inputted to the input VC cell rate control section 12.

In the input VC cell rate control section 12, the input side connection information application section 102 refers to the input side connection information table 103 to apply, based on the input circuit number and the VPI/VCI of the header of the cell, connection information such as a service class, a minimum cell rate, a switch output port identification number and an intra-switch connection identification number to the cell.

The input circuit number is required in order to accommodate a plurality of circuits, in the present case, N+1 circuits, using the plurality of input side circuit interfaces $1_0$ to $1_N$.

The input cell buffer 104 queues cells for each virtual channel.

The cell rate control section 105 reads out cells from the input cell buffer 104 in accordance with the connection information applied to the cells and performs traffic priority control and rate control of the cells to be outputted to the ATM core switch 2. A VC cell rate control signal is fed back to the cell rate control section 105 from the output VC cell rate control section 31 of a corresponding one of the output side circuit interfaces $3_0$ to $3_N$. The cell rate control signal represents a cell storage amount in the corresponding one of the output side circuit interfaces $3_0$ to $3_N$.

Each of the input side circuit interfaces $1_0$ to $1_N$ performs minimum cell rate assurance of virtual channels and peak cell rate shaping of a virtual path and the virtual channels on condition of $\Sigma(VCMCR) \leqq VPPCR \leqq \Sigma(VCPCR)$ in accordance with a cell rate control signal from a corresponding one of the output side circuit interfaces $3_0$ to $3_N$. In other words, cells of each virtual channel are outputted at a rate equal to or higher than the minimum cell rate in accordance with a VC cell rate control signal.

The ATM core switch 2 multiplexes all cells from all of the input side circuit interfaces $1_0$ to $3_N$ and outputs the multiplexed cells to the high speed bus. In this instance, each of the cell filters $22_0$ to $22_N$ in the ATM core switch 2 compares the switch output port identification number applied to each cell with the output port number of the cell filter itself and passes therethrough only those cells which exhibit coincidence in the comparison.

The cell buffers $23_0$ to $23_N$ temporarily store cells having passed through the cell filters $22_0$ to $22_N$ for the individual output ports, perform rate conversion of the cells and output the cells to the output side circuit interfaces $3_0$ to $3_N$ through FIFO operation, respectively.

The output side connection information application section 303 in each of the output side circuit interfaces $3_0$ to $3_N$ refers to the output side connection information table 304 to acquire connection information of each cell such as a service class, a VC minimum cell rate, a VC peak cell rate, a VP peak cell rate, an output circuit number and an output VPI/VCI based on the intra-switch connection identification number applied to the cell and applies the connection information to the cell.

The output cell buffer 305 queues cells for each virtual channel.

The VC cell rate control section 306 reads out cells from the output cell buffer 305 in accordance with connection information applied to the cells and performs traffic priority control and rate control of the cells to be outputted. Cells of each virtual channel are outputted at a rate equal to or higher than the minimum cell rate but equal to or lower than the peak cell rate in accordance with a VP cell rate control signal representative of the cell rate storage amount in the VP cell rate control section 302 in the following stage.

The VP cell rate control section 302 queues cells into a buffer for each virtual path, reads out the cells from the buffer in accordance with the connection information applied to the cells, and performs traffic priority control and rate control of cells to be outputted to a circuit. Cells of each virtual path are outputted at a rate equal to or lower than the peak cell rate.

While a preferred embodiment of the present invention has been described using specific terms, such description is for illustrative purpose only, and it is to be understood that changes and variations may be made without departing from the spirit or scope of the following claims.

What is claimed is:

1. A device comprising:
   an input interface to:
      output cells for at least one virtual channel of a plurality of virtual channels associated with a virtual path,
      receive a control signal, and
      determine a rate at which to output the cells using the control signal; and
   an output interface to:
      store the cells outputted by the input interface,
      generate the control signal, the control signal indicating a number of cells stored for one or more virtual channels of the plurality of virtual channels, and
      transmit the control signal to the input interface, the input interface using the control signal to determine a rate at which to output the cells,
         where the determined rate is based on a peak cell rate of the virtual path.

2. The device of claim 1 where the input interface includes:
   a virtual channel rate control section to:
      receive the control signal, and
      determine the rate at which the cells are output from the input interface based on the number of stored cells indicated in the received control signal.

3. The device of claim 2 where the virtual channel rate control section outputs the cells at the determined rate.

4. The device of claim 2 where the virtual channel rate control section includes:
   a connection application information section to:
      acquire, based on an input circuit number and header information, connection information for a cell, the connection information including at least one of a service class, a minimum cell rate, an output port number, or an identification number for the cell.

5. The device of claim 2 where the virtual channel rate control section includes:
   an input cell buffer to:
      store cells for each virtual channel of the plurality of virtual channels.

6. The device of claim 2 where the virtual channel rate control section includes:
   a cell rate control section to:
      output the cells of each virtual channel at the rate, the rate being equal to or higher than a minimum cell rate.

7. The device of claim 6 where the cell rate control section determines the minimum cell rate from an information table associated with the input interface, the information table storing an input circuit number, a service class, a minimum cell rate, an output port number, and connection identification information.

8. The device of claim 1 where the output interface includes:
   an output virtual channel rate control section to:
      store a cell number accumulated for each virtual channel of the plurality of virtual channels, and
   an output virtual path cell rate control section to:
      queue cells into a buffer for the virtual path, and
      cause cells to be output from the device at a rate equal to or lower than a peak cell rate total value of the plurality of virtual channels.

9. The device of claim 8 where the output virtual path cell rate control section returns a virtual path cell rate control signal to the output virtual channel rate control section, the virtual path cell rate control signal representing a number of cells queued in the buffer for the virtual path.

10. The device of claim 9 where the output virtual channel rate control section outputs cells to the output virtual path cell rate control section based on the virtual path cell rate control signal.

11. The device of claim 8 where the output virtual channel rate control section is associated with a table that stores at least one of a virtual channel minimum cell rate value, a virtual channel peak cell rate value, or a virtual path peak cell rate value.

12. A device comprising:
   an output interface including:
      an output virtual channel section to:
         store cells for at least one virtual channel of a plurality of virtual channels associated with a virtual path, and
         output the cells, based on a control signal, at a rate lower than or equal to a peak cell rate total value of the plurality of virtual channels, and
      an output virtual path section to:
         receive the cells from the output virtual channel section,
         queue the cells into a buffer for the virtual path, and
         send the control signal to the output virtual channel section, the control signal representing a number of cells stored in the buffer for the virtual path.

13. The device of claim 12 where the output virtual channel section outputs the cells at a rate equal to or higher than a minimum cell.

14. The device of claim 12 further comprising:
   an input interface,
      where the output virtual channel section further:
         provides another control signal to the input interface, the other control signal representing a number of cells stored in the output virtual channel section for one or more virtual channels of the plurality of virtual channels, and
      wherein the input interface outputs cells based on the other control signal.

15. The device of claim 12 where the output virtual path section further:
   causes the cells to be output from the device at a rate equal to or lower than a peak cell rate of the virtual path.

16. A method comprising:
   receiving, at an input section of a device, cells via a plurality of virtual channels of a virtual path;
   receiving, at the input section, a control signal from a virtual channel output section of the device, the control signal representing a number of cells stored in the virtual channel output section for each virtual channel of the plurality of virtual channels; and
   dynamically outputting cells, based on the received control signal, via the input section, for at least one virtual channel, at a rate based on a peak cell rate of the virtual path and a peak cell rate total value of the plurality of virtual channels.

17. The method of claim 16 further comprising:
   storing, at the virtual channel output section, the cells from the input section;
   receiving another control signal from a virtual path output section, the other control signal representing a number of cells stored in the virtual path output section for the virtual path; and
   outputting the stored cells from the virtual channel output section to the virtual path output section based on the other control signal.

18. The method of claim 17 further comprising:
   transporting the cells from the input section to the virtual channel output section via a switch.

19. The method of claim 17 where the outputting the stored cells from the virtual channel output section includes:
   outputting the stored cells at a rate equal to or higher than a minimum cell rate and equal to or lower than the peak cell rate total value of the plurality of virtual channels.

20. The method of claim 17 further comprising:
   storing, at the virtual path output section, the cells from the virtual channel output section; and
   outputting the stored cells from the virtual path output section at a rate equal to or lower than the peak cell rate of the virtual path.

* * * * *